United States Patent Office.

YEE FO, OF GRAND LAKE, LOUISIANA.

PROCESS OF PRESERVING SHRIMPS.

SPECIFICATION forming part of Letters Patent No. 310,811, dated January 13, 1885.

Application filed July 2, 1884. (No specimens.)

*To all whom it may concern:*

Be it known that I, YEE FO, a subject of the Emperor of China, and a resident of Grand Lake, parish of Jefferson, and State of Louisiana, have invented a certain new and useful Improvement in Processes of Preserving Shrimps; and I do hereby declare the following to be a full, clear, and correct description of the same.

This invention relates to a process for preserving that class of shell-fish known as "shrimps;" and it consists, first, in placing the same in boiling water containing salt in the proportion of two or two and a half pounds of salt to each bushel of shrimps. The vessel in which these are placed is then covered, and the boiling continued for about one and a half minute, when the cover is removed and the contents of the vessel thoroughly stirred with a paddle or other suitable appliance, so as to thoroughly impregnate the shrimps with the salt. About one minute will suffice for this part of the process. The cover is next replaced and the boiling continued for one and a half or two minutes longer, when the shrimps are removed by means of perforated skimmers or shovels, and spread out on a platform in open air, so as to expose them to the action of the sun. Here they are allowed to remain for two or three days, (according to the heat of the sun,) during which time they are turned and re-turned, say, once in every two hours, so as to insure the removal of all moisture therefrom. When found to be sufficiently dry, they are treaded or walked over by persons wearing moccasins, which process is continued until the heads and shells or heavy scales are detached from the main part of the flesh. By the same devices with which they were placed on the platform, they are removed therefrom, the scales and light particles being fanned off by throwing them upward through the air to baskets or barrels, somewhat in the same style as that practiced with wheat, rice, and other similar grain. The tails of the shrimps (which are the only edible portions thereof) are next removed and placed in canvas bags. These bags are then closed and beaten on boards or benches, so as to detach the small particles of shell or scale still adhering to the flesh. About five minutes will suffice for this part of the process, when the bags are opened and their contents allowed to drop into sifters in which they are thoroughly agitated, so as to remove any dust or scale still adhering thereto. The shrimps are next removed to a dry-house to await packing for shipment, or are immediately packed in barrels or other packages by placing the same therein in layers, and pressing down each layer until the package is finally filled, when it is headed and ready for shipment.

Having described my invention, what I claim as new, and desire to secure by Letters Patent, is—

The herein-described process for preserving shrimps, the same consisting in first placing the shrimps in boiling water containing salt in the proportion stated, in thoroughly stirring the same for the purpose described, and, finally, in successively drying, treading, beating, and packing the shrimps, substantially in the manner and for the purpose set forth.

In testimony whereof I affix my signature in presence of two witnesses.

YEE FO.

Witnesses:
P. N. JUDICE,
R. C. HILL.